(12) United States Patent
Zhao et al.

(10) Patent No.: US 10,794,172 B2
(45) Date of Patent: Oct. 6, 2020

(54) DOWNHOLE DRILLING METHODS AND SYSTEMS WITH TOP DRIVE MOTOR TORQUE COMMANDS BASED ON A DYNAMICS MODEL

(71) Applicant: Halliburton Energy Services, Inc., Houston, TX (US)

(72) Inventors: Yiming Zhao, Houston, TX (US); Jason D. Dykstra, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/336,542

(22) PCT Filed: Dec. 9, 2016

(86) PCT No.: PCT/US2016/065791
§ 371 (c)(1),
(2) Date: Mar. 26, 2019

(87) PCT Pub. No.: WO2018/106256
PCT Pub. Date: Jun. 14, 2018

(65) Prior Publication Data
US 2019/0284924 A1 Sep. 19, 2019

(51) Int. Cl.
*E21B 44/04* (2006.01)
*E21B 44/00* (2006.01)
*G05B 19/042* (2006.01)

(52) U.S. Cl.
CPC .............. *E21B 44/04* (2013.01); *E21B 44/00* (2013.01); *G05B 19/042* (2013.01); *G05B 2219/45129* (2013.01)

(58) Field of Classification Search
None
See application file for complete search history.

(56) References Cited

U.S. PATENT DOCUMENTS

| 9,885,231 | B2* | 2/2018 | Nessjoen | G05D 19/02 |
|---|---|---|---|---|
| 9,920,612 | B2* | 3/2018 | Dwars | E21B 44/00 |
| 9,932,811 | B2* | 4/2018 | Dwars | E21B 44/00 |
| 2011/0232966 | A1* | 9/2011 | Kyllingstad | E21B 44/00 175/24 |
| 2012/0255778 | A1* | 10/2012 | Reckmann | E21B 44/04 175/26 |
| 2014/0305702 | A1* | 10/2014 | Bowley | E21B 44/04 175/27 |
| 2014/0318865 | A1 | 10/2014 | Doris | |
| 2015/0240615 | A1 | 8/2015 | Dykstra et al. | |

(Continued)

FOREIGN PATENT DOCUMENTS

| WO | 2015026311 A1 | 2/2015 |
|---|---|---|
| WO | 2016040573 A1 | 3/2016 |
| WO | 2018106256 A1 | 6/2018 |

*Primary Examiner* — Ramesh B Patel
(74) *Attorney, Agent, or Firm* — Scott Richardson; Parker Justiss, P.C.

(57) ABSTRACT

A drilling system includes a top drive having a motor with a rotating shaft and an adjustable torque. The drilling system also includes a connector that couples the rotating shaft to a drillstring. The drillstring system also includes a controller that provides torque commands to the motor, wherein the torque commands are based at least in part on a dynamics model and operate to dampen vibrations due to torsional wave propagation along the drillstring.

20 Claims, 4 Drawing Sheets

(56) References Cited

U.S. PATENT DOCUMENTS

| | | |
|---|---|---|
| 2015/0322766 A1 | 11/2015 | Veltman |
| 2016/0138382 A1 | 5/2016 | Badkoubeh et al. |
| 2016/0194946 A1 | 7/2016 | Dykstra et al. |
| 2016/0237802 A1 | 8/2016 | Boone et al. |
| 2016/0273332 A1* | 9/2016 | Dwars .................... E21B 44/00 |
| 2016/0281488 A1* | 9/2016 | Dwars .................... E21B 44/00 |
| 2017/0152736 A1* | 6/2017 | Kyllingstad ............ E21B 44/00 |
| 2018/0274352 A1* | 9/2018 | Orban .................... E21B 44/04 |

* cited by examiner

DOWNHOLE DRILLING METHODS AND SYSTEMS WITH TOP DRIVE MOTOR TORQUE COMMANDS BASED ON A DYNAMICS MODEL

CROSS-REFERENCE TO RELATED APPLICATION

This application is the National Stage of, and therefore claims the benefit of, International Application No. PCT/US2016/065791 filed on Dec. 9, 2016, entitled "DOWNHOLE DRILLING METHODS AND SYSTEMS WITH TOP DRIVE MOTOR TORQUE COMMANDS BASED ON A DYNAMICS MODEL," which was published in English under International Publication Number WO 2018/106256 on Jun. 14, 2018. The above application is commonly assigned with this National Stage application and is incorporated herein by reference in its entirety.

BACKGROUND

Hydrocarbon exploration and production involves drilling boreholes, where different boreholes can be used for exploration operations, monitoring operations, injection operations, and production operations. The process of drilling boreholes is expensive and a poorly drilled borehole can increase the cost of subsequent operations (e.g., well completion and/or production operations). In some cases, a poorly drilled borehole can result in the borehole being unsuitable for production. In such case, the poorly drilled borehole may need to be plugged and a replacement borehole may be needed.

Efforts to improve hydrocarbon exploration and production operations are ongoing. One category of such efforts involves increasing the efficiency of drilling operations and/or improving borehole trajectories/profiles. To this end, a bottomhole assembly (BHA) may include stabilizers and/or reamers. Also, a top drive may be controlled to mitigate vibrations and/or oscillations along the drillstring. One known top drive control technique involves measuring the angular speed and torque at a point along the drillstring. Collection of these measurements typically involves installation of supplemental speed and torque sensors at a portion of the drillstring accessible to service personnel (e.g., at earth's surface). The installation of these supplemental sensors can be problematic because drilling rigs are often rented and service personnel do not necessarily have permission to modify the drilling rig components. Also, these supplemental sensors may need to be reinstalled every time another drillstring segment is added (e.g., every 30 or 60 feet or so). Reinstallation and possible recalibration of such sensors represents a drilling delay that results in higher drilling cost.

BRIEF DESCRIPTION OF THE DRAWINGS

Accordingly, there are disclosed herein downhole drilling methods and systems with top drive motor torque commands based on a dynamics model. In the drawings.

Figure 1:
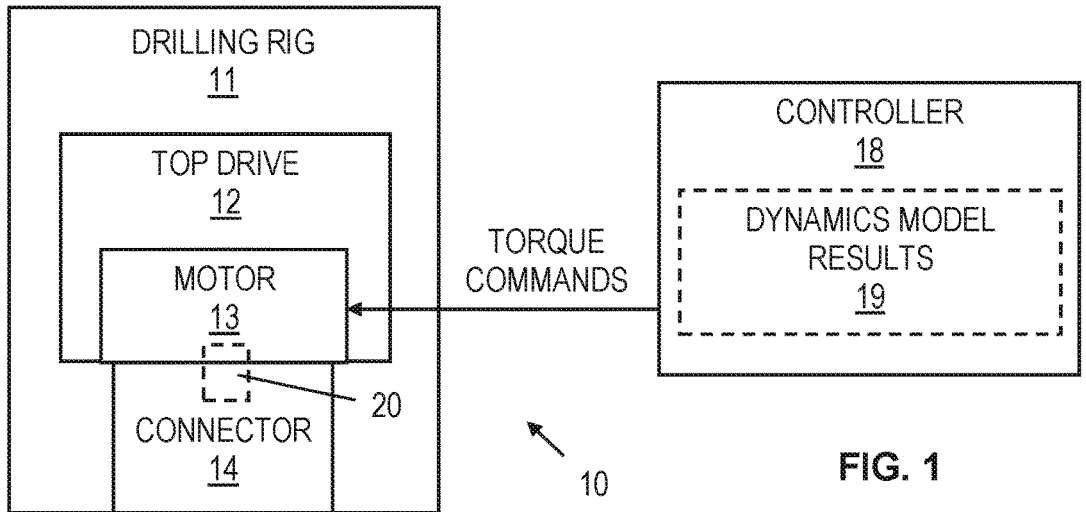
FIG. 1 is a block diagram showing an illustrative drilling system.

It should be understood, however, that the specific embodiments given in the drawings and detailed description below do not limit the disclosure. On the contrary, they provide the foundation for one of ordinary skill to discern the alternative forms, equivalents, and other modifications that are encompassed in the scope of the appended claims.

DETAILED DESCRIPTION

Disclosed herein are downhole drilling methods and systems with top drive motor torque commands based on a dynamics model, where the torque commands operate to dampen vibrations due to torsional wave propagation along the drillstring. In at least some embodiments, the dynamics model is used to determine a disturbance torque at the connector, where the disturbance torque accounts for torsional wave propagation along the drillstring. For example, in one embodiment, the dynamics model estimates the disturbance torque at the connector to be a function of various parameters such as a rotational inertia, a rotation speed of a top drive motor shaft, a friction coefficient, a static friction component, and a torque applied a top drive motor. Additional or fewer parameters are possible as well. In another embodiment, the dynamics model corresponds to a state observer applied to a top drive motor. In this embodiment, state observer error (some or part of the observed torque error) is interpreted as a disturbance torque at the connector.

In at least some embodiments, the estimated disturbance force at the connector is used by a controller to provide the torque commands to a top drive motor. For example, the estimated disturbance force at the connector may be used to determine a vibration dampening signal that adjusts torque commands to a top drive motor to account for torsional wave propagation along the drillstring. As desired, the vibration dampening signal can be combined with a speed regulation signal to provide torque commands to a top drive motor. The resulting torque commands operate to dampen vibrations due to torsional wave propagation along the drillstring.

In at least some embodiments, an example drilling system includes a top drive having a motor with a rotating shaft and an adjustable torque. The drilling system also includes a connector that couples the rotating shaft to a drillstring. The drilling system also includes a controller that provides torque commands to the motor, wherein the torque commands are based at least in part on a dynamics model and operate to dampen vibrations due to torsional wave propagation along the drillstring. Meanwhile, an example drilling method includes estimating, by a processing unit, top drive parameters. The drilling method also includes applying, by the processing unit, the estimated top drive parameters to a dynamics model. The drilling method also includes generating, by a controller, torque commands based at least in part on a result of said applying the top drive parameters to the dynamics model. The drilling method also includes providing, by the controller, the torque commands to a top drive motor coupled to a drillstring by a connector associated with the dynamics model, wherein the torque commands operate to dampen vibrations due to torsional wave propagation along the drillstring. Various dynamics model options and related top drive torque command control options are described herein.

The disclosed systems and methods are best understood when described in an illustrative usage context. FIG. 1 is a block diagram showing an illustrative drilling system 10. The drillstring system 10 includes drilling rig 11 with a top drive 12 having a motor 13. The motor 13 has a rotating shaft 20 and an adjustable torque. The rotating shaft 20 is coupled to a drillstring 15 using a connector 14 such as a swivel or other known connector option. At the opposite end of the drillstring 15 there is a bottomhole assembly (BHA) 16 with a drill bit 17 that operates to crush rock by downward force and rotating. To rotate the drill bit 17, torque commands are provided to the motor 13, which applies a torsional force to the rotating shaft 20. The torsional force is extended from the rotating shaft 20 to the drillstring 15 via the connector 15. Assuming the torsional force applied to the drillstring 15 by the motor 13 and connector 14 is greater than frictional forces and inertia along the drillstring 15, the BHA 16 and drill bit 17 will rotate. Some twisting of the drillstring 15 occurs during this process, resulting in torsional wave propagation from the top drive 12 to the drill bit 17 (or between sticking points along the drillstring 15), and from the drill bit 17 to the top drive 13. Torsional wave propagation, friction forces, and/or other forces are manifest over time as stick-slip, where the drill bit 17 is either rotating too little or too much. To reduce stick-slip, a controller 18 for the motor 13 provides torque commands that account for torsional wave propagation. The controller 18 may be separate from the top drive 12 as shown in FIG. 1, or may be part of the top drive 12.

In at least some embodiments, the torque commands provided by the controller 18 are generated using dynamics model results 19. The dynamics model results 19 are either determined by the controller 18 or are received from another source external to the controller 18 (e.g., a processing unit or computer in communication with the controller 18). In either case, the dynamics model results 19 may include, for example, a disturbance torque at the connector 14, where the disturbance torque at the connector 14 is attributable to torsional wave propagation. The controller 18 uses the dynamics model results 19 to determine a vibration dampening signal that modifies the torque commands to the motor 13. In at least some embodiments, controller 19 combines the vibration dampening signal with a speed regulation signal to provide the torque commands to the motor 13.

Figure 2:
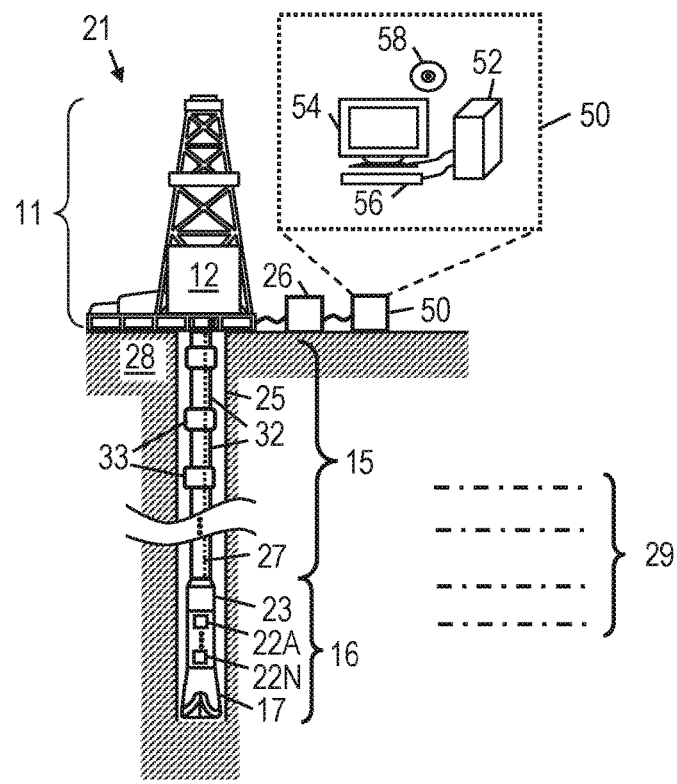
FIG. 2 is a schematic diagram showing an illustrative drilling environment.

FIG. 2 shows an illustrative drilling environment 21. In FIG. 2, a drilling rig 11 with top drive 12 enables drillstring 15 to be lowered and raised in a borehole 25 that penetrates formations 29 of the earth 28. The drillstring 15 is formed, for example, from a modular set of drillstring segments 32 and adaptors 33. At the lower end of the drillstring 15, a BHA 16 with a drill bit 17 removes material from the formations 29 using directional drilling techniques. The BHA 16 also includes sensors or tools 22A-22N to collect information about the BHA 16, the downhole environment, and/or formations 29. Also, a communication interface 23 may be provided with the BHA 16 to support uplink and/or downlink telemetry. Example telemetry options that may be employed include, but are not limited to, wired telemetry, mud pulse telemetry, acoustic telemetry, and/or wireless electromagnetic telemetry. In at least some embodiments, a cable 27 may extend from the BHA 16 to earth's surface. For example, the cable 27 may take different forms such as embedded electrical conductors and/or optical waveguides (e.g., fibers) to enable transfer of power and/or communications between the BHA 16 and earth's surface. In other words, the cable 27 may be integrated with, attached to, or inside the modular components of the drill string 15.

In FIG. 2, an interface 26 at earth's surface may send downlink telemetry signals to the BHA 16 or receive uplink telemetry signals from the BHA 16. A computer system 50 in communication with the interface 26 may perform various operations to direct drilling operations and/or logging operations. In at least some embodiments, the computer system 50 includes a processing unit 52 that performs drilling operations by executing software or instructions obtained from a local or remote non-transitory computer-readable medium 58. The computer system 50 also may include input device(s) 56 (e.g., a keyboard, mouse, touchpad, etc.) and output device(s) 54 (e.g., a monitor, printer, etc.). Such input device(s) 56 and/or output device(s) 54 provide a user interface that enables an operator to interact with the top drive 12, the BHA 16 and/or software executed by the processing unit 52. For example, the computer system 50 may enable an operator to select drilling options, to monitor drilling operations, to selecting logging options, to monitor logging operations, and/or to review logging results.

In at least some embodiments, the processing unit 52 applies measured and/or estimated parameters to a dynamics model and provides dynamics model results 19 to a controller 18 for the top drive 12. The controller 18 may be included, for example, with the top drive 12 or the interface 26. In at least some embodiments, measured parameters applied to a dynamics model are obtained from components of the top drive 12. Meanwhile, estimated parameters applied to the dynamics model may be determined by the processing unit 52.

Regardless of location, the controller 18 uses the dynamics model results 19 as described herein to provide torque commands to a motor 13 (see FIG. 1) of the top drive 12. In at least some embodiments, the torque commands correspond to different current levels to drive the motor 13 as a function of time. As an example, the dynamics model results 19 may include a disturbance torque at the connector 14 that couples the motor 13 of the top drive 12 to the drill string 15, where the disturbance torque at the connector 14 is attributable to torsional wave propagation. Specifically, the controller 18 may use the dynamics model results 19 to determine a vibration dampening signal that adjusts torque commands to the motor 13 account for torsional wave propagation along the drillstring 15. As an option, the controller 18 may combine the vibration dampening signal with a speed regulation signal to provide torque commands to the motor 13.

Figure 3:
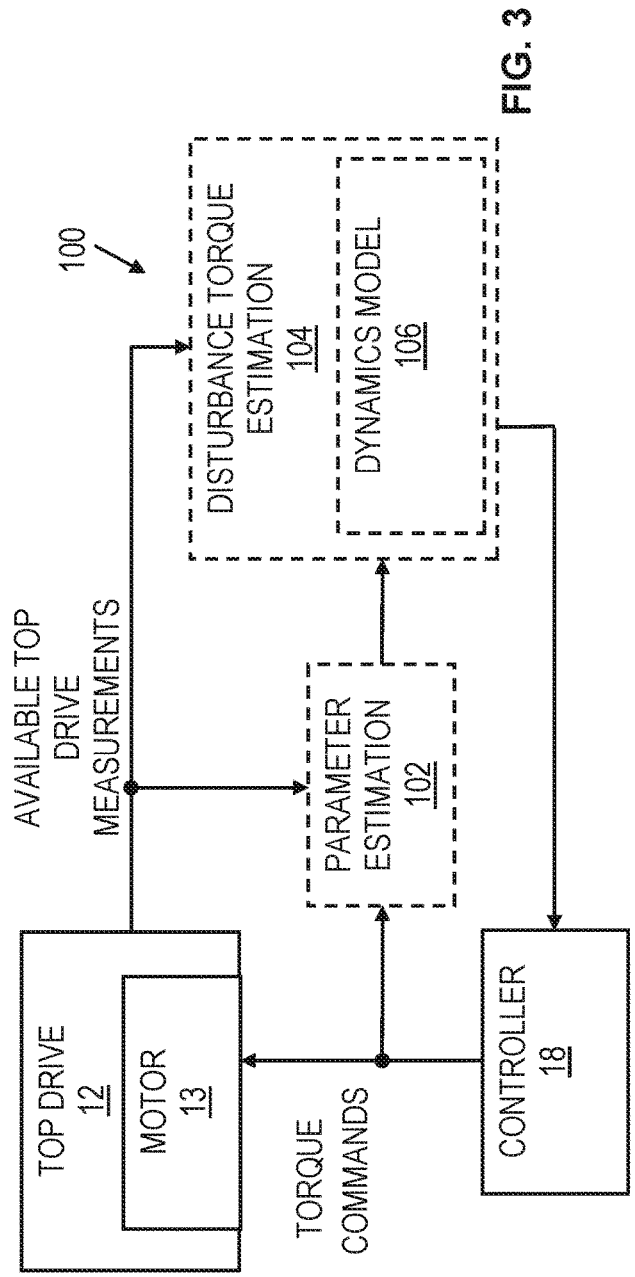
FIG. 3 is a block diagram showing an illustrative top drive motor control process.

FIG. 3 is a block diagram showing an illustrative top drive motor control process 100. As shown in FIG. 3, the process 100 involves a top drive 12 that provides available measurements (e.g., rotation speed of the top drive motor shaft and the torque applied to the motor 13) to a parameter estimation block 102 and a disturbance torque estimation block 104, which represent processing blocks that can be performed by one or more of a processing unit (e.g., processing unit 52), a computer system (e.g., computer system 50), and controller 18. The parameter estimation block 102 provides one or more estimated parameters (e.g., a rotational inertia, a friction coefficient, a static friction component) to the disturbance torque estimation block 104, which employs a dynamics model 106. In at least some embodiments, the dynamics model 106 applies estimated parameters from the parameter estimation block 102 and available measurements from the top drive 12 to the dynamics model 106.

In at least some embodiments, the dynamics model 106 is given as:

$$T_c = J\dot{V} + \alpha V + \beta - T, \quad \text{Equation (1)}$$

where $T_c$ is the disturbance torque at the connector, J is a rotational inertia, V is a rotational speed of the motor shaft, $\dot{V}$ is the derivative of V with respect to time (i.e., acceleration), α is a friction coefficient, β is a static friction component, and T is a torque applied to the motor. In at least some embodiments, V and T correspond to available top drive measurements provided by the top drive 12, and J, α, and β correspond to values output from the parameter estimation block 102. In at least some embodiments, the disturbance torque estimation block 104 determines $T_c$ using Equation 1, the measured values for V and T, and the estimated values for J, α, and β.

Figure 5:
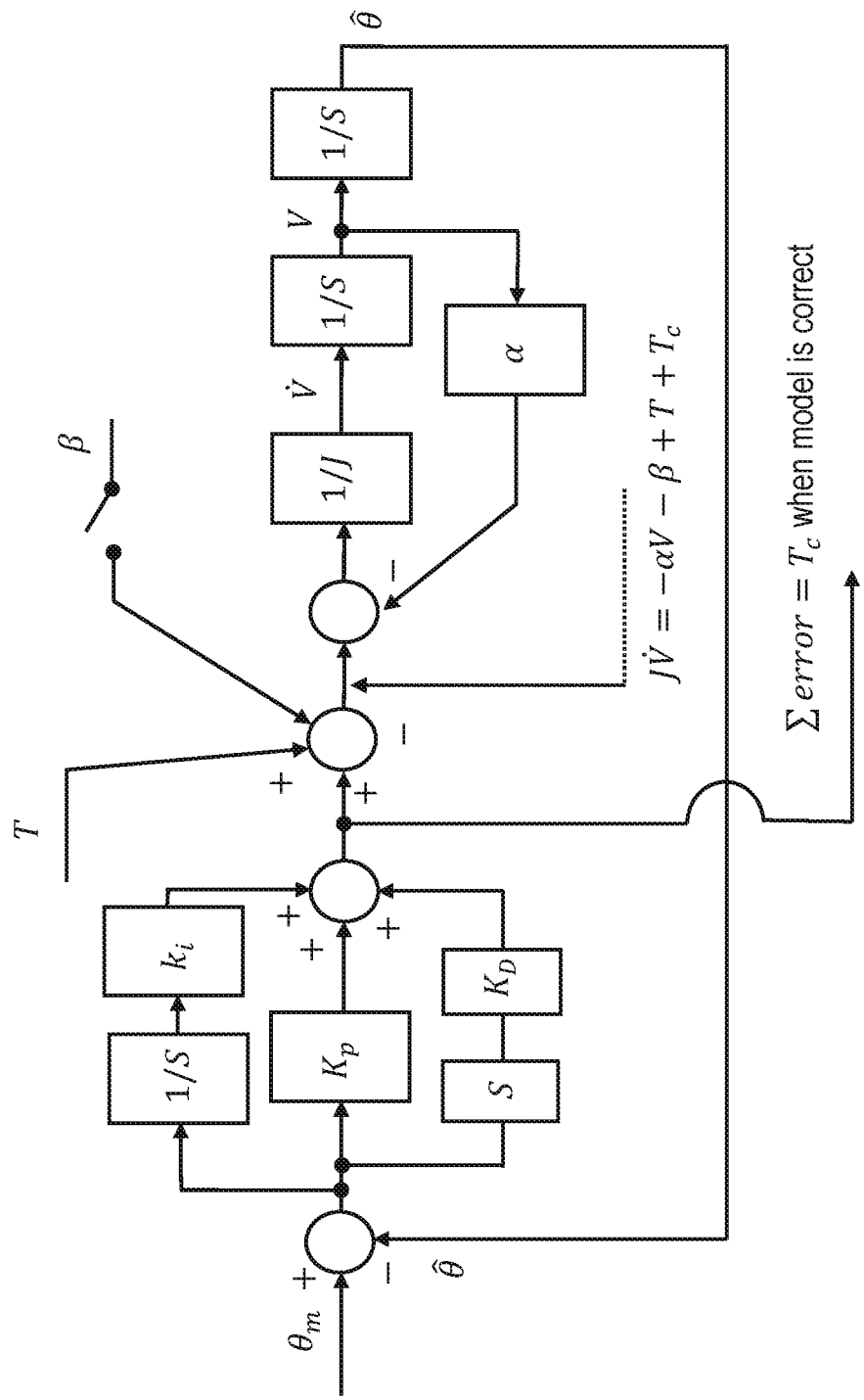
FIG. 5 is a block diagram showing an illustrative state observer for a top drive motor.

In other embodiments, the dynamics model 106 corresponds to a state observer for the motor 13, where state observer error (some or part of the observed torque error) is interpreted as a value for $T_c$. FIG. 5 illustrates an example state observer for the motor 13. The state observer options can provide a more reliable and noise-resistant estimation of $T_c$. It is noted that when the proportional term is zero, the integral term will be the model error. When the temporal change of the proportional term is quick or in line with the expected frequency of the stick-slip waveform, it is assumed that the state observer provides an estimate of $T_c$.

Regardless of the particular dynamics model 106 used, the disturbance torque estimation block 104 may provide a $T_c$ value to the controller 18, which provides torque commands to the motor 13. The controller 18 generates the torque commands based on a vibration dampening signal determined at least in part from the $T_c$ value provided by the disturbance torque estimation block 104. The vibration dampening signal is used to adjust torque commands to the motor 13 in a manner that accounts for torsional wave propagation along the drillstring (e.g., drillstring 15) being rotated by the motor 13. As an option, the controller 18 may combine the vibration dampening signal with a speed regulation signal to provide torque commands to the motor 13.

Figure 4:
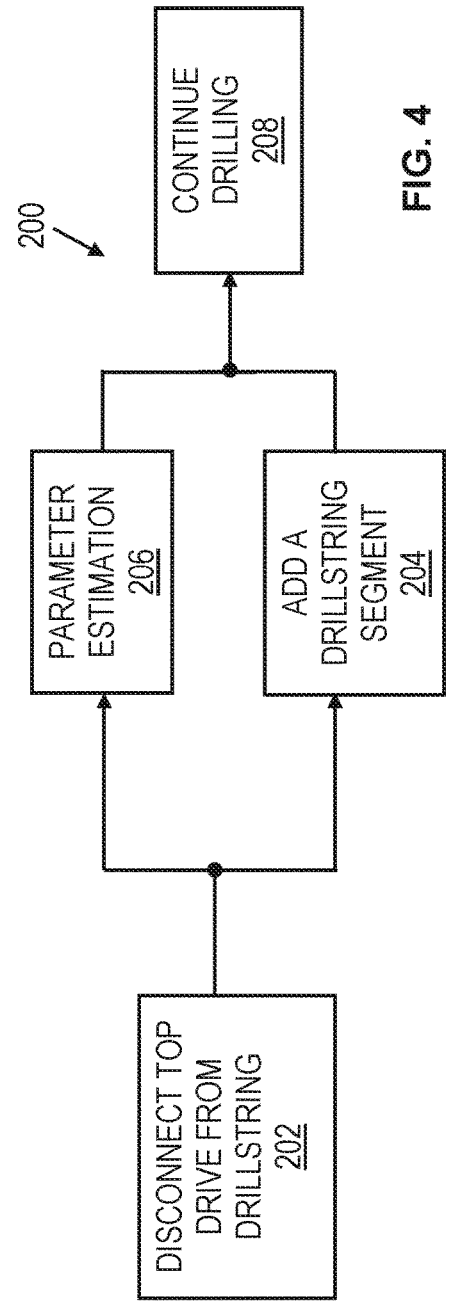
FIG. 4 is a block diagram showing an illustrative drilling process.

FIG. 4 is a block diagram showing an illustrative drilling process 200. As shown, drilling process 200 includes disconnecting a top drive (e.g., top drive 12) from a drillstring (e.g., drillstring 15) at block 202. At block 204, a drillstring segment is added. While block 204 is being performed, parameter estimation (e.g., the same or similar to parameter estimation block 102 in FIG. 3) is performed at block 206. At block 208, drilling continues based at least in part on parameters estimated at block 206. For example, the drilling operations of block 208 may involve providing torque commands to a top drive motor based at least in part on a dynamics model (e.g., dynamics model 106), where the torque commands operate to dampen vibrations due to torsional wave propagation along the drillstring as described herein. By performing parameter estimation at block 206 in parallel with adding a drillstring segment to a drillstring at block 204, at least some processing delays related to providing torque commands as described herein can be avoided.

Without limitation, an overview of how the dynamics model given in Equation 1 was determined is provided. Also, various options for controller 18 are described. First, some assumptions were made including the top drive 12 being considered as a rigid body (at least much more rigid than the drillstring 15). Therefore, the disturbance torque at the connector 14 can be estimated as an external force on the top drive 12. If all other external forces as well as the response of the top drive 12 are known, then this disturbance torque at the connector 14 can be estimated based on the rigid body dynamics equation. Also, because the top drive 12 is rigid, the angular speed at the connector 14 is equal to the angular speed of the top drive 12. Accordingly, the dynamics of the top drive 12 (including the gear box) can be modeled by the following differential equations $$\dot{\phi} = V \quad \text{Equation (2)}$$

$$J\dot{V} = -\alpha V - \beta + T + T_c, \quad \text{Equation (3)}$$

where ϕ is the rotation angle of the top drive output shaft, V is the rotational speed of the top drive output shaft (e.g., rotating shaft 20), $\dot{V}$ is the derivative of V with respect to time, and J is the equivalent rotational inertia. Also, α is a friction coefficient, β is a consequence of the static friction, $T_c$ is the disturbance torque at the connection between the top drive 12 and the drillstring 15 (at the connector 14), and T is the torque applied to the rotor of the motor 13 by an electromagnetic field (or hydraulic fluid, if the motor is hydraulic). Here T and V are assumed known, which is typically the case for electric motors.

To determine the disturbance torque at the connector 14, estimates for J, α and β in Equation 3 is needed. Different methods can be applied for this purpose. If the drillstring 15 is disconnected from the top drive 12, then $T_c = 0$. This is the case before drilling, and during stops in the drilling process (e.g., when the drillstring 15 is disconnected from the top drive 12 to add a new drillstring segment).

After a Laplace transform, the speed equation of the top drive dynamics of Equation 3 can be rewritten as:

$$V - \frac{a}{s+a}V = -\frac{\alpha}{J}\frac{V}{s+a} - \frac{\beta}{J}\frac{1}{s+a} + \frac{1}{J}\frac{T}{s+a}, \quad \text{Equation (4)}$$

where a>0 is the cut-off frequency of a low-pass filter. If $$\Omega = \left[\frac{V}{s+a} \quad \frac{1}{s+a} \quad \frac{T}{s+a}\right]^T \text{ and } y = V - \frac{a}{s+a}V,$$

then the above expression can be written as:

$$y = \Omega^T \theta, \quad \text{Equation (5)}$$

where $$\theta = \left[-\frac{\alpha}{J}, -\frac{\beta}{J}, \frac{1}{J}\right]^T.$$

If $\hat{\theta} = [\hat{\theta}_1, \hat{\theta}_2, \hat{\theta}_3]^T$ is the estimate of θ, and $\hat{y} = \Omega^T \hat{\theta}$ is the model prediction, then the prediction error is given by $\eta = \hat{y} - y = \Omega^T(\hat{\theta} - \theta)$, and the parameter estimates $\hat{\theta}$ is determined based on the minimization of the norm of η. This can be achieved by either a gradient update or a least square update of $\hat{\theta}$ as follows:

Gradient update is given by:

$$\dot{\hat{\theta}} = \text{Proj}_{\hat{\theta}}\left(\text{sat}_{\hat{\theta}_M}\left(-\Gamma\frac{\Omega\eta}{1+v\text{Trace}(\Omega^T\Omega)}\right)\right), \quad \text{Equation (6)}$$

where Γ is a positive definite matrix of appropriate dimension, v>0, $\hat{\theta}_M$ is a vector describing the maximum update rate of the parameter estimate $\hat{\theta}$, and $$Proj_a(b) = \begin{cases} b & \text{if } a \in F, \text{ or } b^T n_F < 0 \\ 0 & \text{if } a \notin F, \text{ and } b^T n_F > 0 \end{cases} \quad \text{Equation (7)}$$

In Equation 7, a and b are vectors of the same dimension, F is a preselected feasible domain for a, $n_F$ is the unit normal vector of the boundary of F pointing outward. The update rate function is given by $$\text{sat}_q(p) = \min(\max(p, -q), q), \quad \text{Equation (8)}$$

where q is the preselected update rate limit for the parameter p, and the min and max functions are applied to each component of vectors p and q.

The least square update rule takes the following form:

$$\dot{\hat{\theta}} = Proj_{\hat{\theta}}\left(\text{sat}_{\dot{\hat{\theta}}_M}\left(-\Gamma \frac{\Omega \eta}{1 + \nu Trace(\Omega^T \Gamma \Omega)}\right)\right), \quad \text{Equation (9)}$$

where $\Gamma$ is updated by $$\dot{\Gamma} = \alpha \Gamma - \frac{\Gamma \Omega \Omega^T \Gamma}{1 + \nu Trace(\Omega^T \Gamma \Omega)}, \quad \text{Equation (10)}$$

$\alpha > 0$ being the forgetting factor. After convergent value of $\hat{\theta}_1, \hat{\theta}_2, \hat{\theta}_3$ are achieved, the parameter estimates can be calculated as $$J = \frac{1}{\hat{\theta}_3} \quad \text{Equation (11)}$$

$$\alpha = -\hat{\theta}_1 / \hat{\theta}_3 \quad \text{Equation (12)}$$

$$\beta = -\hat{\theta}_2 / \hat{\theta}_3 \quad \text{Equation (13)}$$

In order for the parameters to converge to the correct values, the input T to the top drive need to have a rich frequency content. A chirp signal input covering a preselected frequency range is typically sufficient for the parameters to converge.

As previously discussed, in at least some embodiments, the disturbance torque at the connector 14 is estimated using Equation 1, which is given as:

$$T_c = J\dot{V} + \alpha V + \beta - T.$$

Because the top drive 12 is much more rigid than the drillstring 15, the top drive 12 can be considered a rigid body with uniform speed. Therefore, the speed of the top drive 12 itself approximates the speed at the connector 15. The top drive speed can be measured internally at the top drive 12.

Using the proposed technique, no additional sensor needs to be added between the drillstring 15 and the top drive 12 to determine the disturbance torque at the connector 14. With the proposed technique, the speed and torque at the connector 14 can be estimated. Thereafter, controller 18 can use these estimates to generate torque commands for the motor 13, where the torque commands operate to damp out excessive oscillations in the drillstring 15 and regulate the rotational speed to a set point.

In at least some embodiments, the controller 18 operates to mitigate torsional wave propagation along the drillstring 15, where torsional wave propagation can be represented as follows. Assume $\vec{V}(x-ct)$ defines the torsional wave propagating towards the top drive 12, and $\overleftarrow{V}(x+ct)$ defines the torsional wave propagating towards the drill bit 17. Also, assume $\vec{u}(x-ct)$ and $\overleftarrow{u}(x+ct)$ define the rotational angle waves associated with $\vec{V}(x-ct)$ and $\overleftarrow{V}(x+ct)$, respectively. Also, assume $\vec{T}(x-ct)$ and $\overleftarrow{T}(x+ct)$ define the torque waves associated with $\vec{V}(x-ct)$ and $\overleftarrow{V}(x+ct)$. With these definitions, the following equation holds $$\vec{V}(x-ct) = \frac{\partial}{\partial t}\vec{u}(x-ct) = -c\frac{\partial}{\partial x}\vec{u}(x-ct) = -\frac{c}{GI_t}\vec{T}(x-ct). \quad \text{Equation (14)}$$

If let $\gamma = GI_t/c$, then $-\gamma\vec{V} = \vec{T}$. Similarly, $\gamma\overleftarrow{V} = \overleftarrow{T}$.

Also, if $V = \vec{V} + \overleftarrow{V}$, $T = \vec{T} + \overleftarrow{T}$, then $$\vec{V} = \frac{1}{2}\left(V - \frac{T}{\gamma}\right) \quad \text{Equation (15)}$$

$$\overleftarrow{V} = \frac{1}{2}\left(V + \frac{T}{\gamma}\right) \quad \text{Equation (16)}$$

During drilling operations, $\overleftarrow{V}$ can be generated by maneuvering the top drive 12, while the top drive 12 also needs to react to $\vec{V}$ at the same time to prevent bouncing $\vec{V}$ back to the drillstring 15. In at least some embodiments, the controller 18 may include multiple control blocks to determine torque commands for the motor 13 that account for $\overleftarrow{V}$ and $\vec{V}$. Example control blocks include, but are not limited to, a torsional wave propagation estimation block, a Speed Regulation Controller (SRC) block, a Vibration Dampening Controller (VDC) block, and a Supervisory/Adjustment block.

The SRC block provides a first control signal (producing $\overleftarrow{V}$) referred to as the speed regulation control signal. The VDC block provides a second control signal (reacting to $\vec{V}$) referred to as the vibration dampening control signal. The Supervisory/Adjustment block can adjust the two signals from the SRC and VDC blocks as needed using a set point update process.

More specifically, in at least some embodiments, the SRC block can provide the first control signal by driving $\overleftarrow{V}(L, t)$ to a rotational speed set point $V_{LS}(t)$. Numerous speed controllers can be used for the SRC block, such as Proportional-Integral-Derivative (PID) controller, robust controller, sliding mode controller, etc. The proposed control architecture does not pose any requirement on the form of the controller used in SRC block. Meanwhile, the VDC block can provide the second control signal by reacting to the torsional wave moving towards the top drive 12, $\vec{V}(L, t)$, and rotates the top drive 12 in a manner such that the connector 14 becomes non-reflective for $\vec{V}$. In other words, the second control signal provided by the VDC block should absorb all the torsional vibration energy in $\vec{V}(L, t)$. In one embodiment, the VDC block has the following form:

$$F_T = p^*(\vec{V}(L, t) - V_{RS}(t)) + J_T \frac{d}{dt} \vec{V}(L, t),$$ Equation (17)

As another option, the VDC block can provide speed control to produce a top drive speed that follows $\vec{V}(L, t)$ from the drillstring 15. $V_{RS}(t)$ in Equation 17 is a set-point for $\vec{V}(L, t)$. Assume $V_{ref}$ is the desired rotational speed of the entire drillstring 15 and top drive 12 when the torsional vibration is mitigated. If there is no external torque at the drill bit 17, after all vibrations are damped out, T=0 and $\vec{V} = \overleftarrow{V} = \frac{1}{2}V$ along the entire drillstring 15. In this case, $V_{LS} = V_{ref}/2$ is assumed such that $V = \vec{V} + \overleftarrow{V} = V_{ref}$. Similarly, suppose the drill bit 17 is subject to a constant torque $T_{bit}$ from bit-rock interaction after all vibrations are mitigated, then $\overleftarrow{V} = (V_{ref} + T_{bit}/\alpha)/2$ and $\vec{V}_s = (V_{ref} - T_{bit}/\alpha)/2$ is assumed to ensure constant speed $V_{ref}$ along the drillstring 15.

In at least some embodiments, the Supervisory/Adjustment block estimates $T_{bit}$ using measurements and updates $\overleftarrow{V}_s$ and $\vec{V}_s$ accordingly to ensure that the desired speed $V_{ref}$ is achieved. In one embodiment of the proposed controller, $T_{bit}$ is estimated by low-pass-filtering $2\gamma(\overleftarrow{V} - \vec{V})$.

In at least some embodiments, the controller 18 employs a torsional wave propagation estimation block, the SRC block, the VDC block, and the Supervisory/Adjustment block to generate torque commands for the motor 13. The torsional wave propagation estimation block may use $$\vec{V} = \frac{1}{2}\left(V - \frac{T_c}{\gamma}\right) \text{ and } \overleftarrow{V} = \frac{1}{2}\left(V + \frac{T_c}{\gamma}\right),$$

where $\alpha = I_t\sqrt{G\rho}$. Meanwhile, the SRC block drives $\overleftarrow{V}$ to the set-point $\overleftarrow{V}_s$ using $T_s = p_s(\overleftarrow{V}_s - \overleftarrow{V}) + q_s\int(\overleftarrow{V}_s - \overleftarrow{V})dt$. A simple PID controller or other available controller is possible for the SRC block. The VDC block drives the top drive 12 such that it follows the change of $\vec{V}$ relative to $\vec{V}_s$ using $$T_v = -\frac{GI_t}{c}(\vec{V} - \vec{V}_s) + J_T\frac{d(\vec{V} - \vec{V}_s)}{dt}.$$

Supervisory/Adjustment block may perform various tasks such as estimating the static component of the bit torque based on low-pass filtering such as $T_{bit} = 2\gamma(\overleftarrow{V} - \vec{V})$. For better performance, the time constant of the low-pass filter should be set longer than twice the time it takes for the torsional wave to travel from one end of the drillstring 15 to the other. The Supervisory/Adjustment block may also provide set points $\overleftarrow{V}_s = (V_{ref} + T_{bit}/\gamma)/2$ and $\vec{V}_s = (V_{ref} - T_{bit}/\gamma)/2$ to the SRC block and VDC block. Further, the Supervisory/Adjustment block may compute a torque correction ($T_b$) which helps to expedite the elimination of steady state error between $V_{ref}$ and V. An integral controller such as $T_b = q_b\int(V_{ref} - V)dt$ can be used for this operation. Other options for the controller 18 are possible, where a dynamics model is used as described herein.

Figure 6:
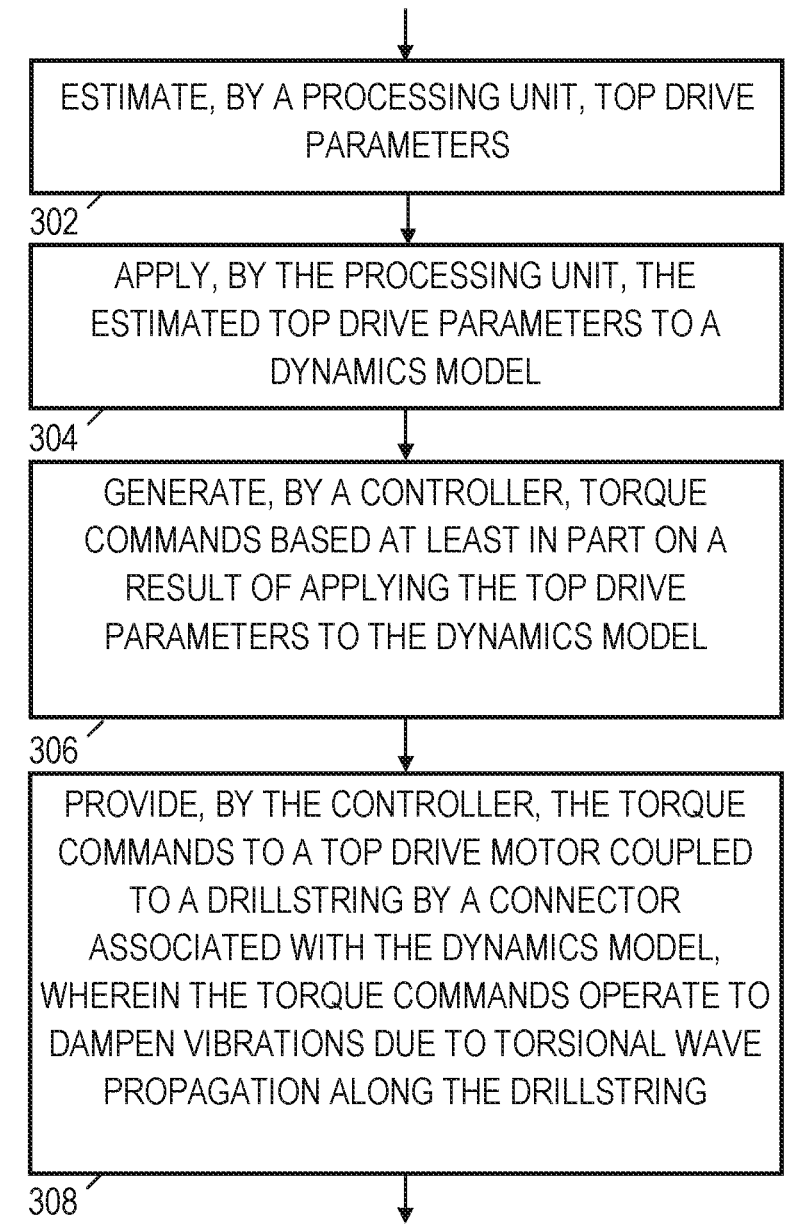
FIG. 6 is a flowchart showing an illustrative drilling method involving top drive motor torque commands based on a dynamics model.

FIG. 6 is a flowchart showing an illustrative drilling method 300 involving top drive motor torque commands based on a dynamics model (e.g., dynamics model 106). At block 302, top drive parameters (e.g., for J, α, and β) are estimated by a processing unit (e.g., processing unit 52, computer system 50, or controller 18). At block 304, the estimated top drive parameters are applied to a dynamics model (e.g., Equation 1 or a state observer for motor 13). At block 306, torque commands are generated by a controller (e.g., controller 18) based at least in part on a result of applying the top drive parameters to the dynamics model. For example, the dynamics model result may be an estimated disturbance torque at the connection (e.g., connector 14) between a top drive motor (e.g., motor 13) and a drillstring (e.g., drillstring 15). The disturbance torque at the connector 14 may be provided to a controller (e.g., controller 18) to facilitate generating torque commands that account for torsional wave propagation along the drillstring 15 as described herein. At block 308, the controller provides the torque commands to a top drive motor (e.g., motor 13) coupled to a drillstring (e.g., drillstring 15) by a connector (e.g., connector 14) associated with the dynamics model (e.g., dynamics model 106), where the torque commands operate to dampen vibrations due to torsional wave propagation along the drillstring. As desired, the method 300 can be repeated over time. Also, it should be appreciated that some of the method 300 (e.g., at least block 302) can be performed while a new drillstring segment is being added to a drillstring. Also, it should be appreciated that the dynamics model can be updated over time based on an error analysis.

Embodiments disclosed herein include:

A: A drilling system that comprises a top drive having a motor with a rotating shaft and an adjustable torque. The drilling system also comprises a connector that couples the rotating shaft to a drillstring. The drilling system also comprises a controller that provides torque commands to the motor, wherein the torque commands are based at least in part on a dynamics model and operate to dampen vibrations due to torsional wave propagation along the drillstring.

B: A drilling method that comprises estimating, by a processing unit, top drive parameters. The drilling method also comprises applying, by the processing unit, the estimated top drive parameters to a dynamics model. The drilling method also comprises generating, by a controller, torque commands based at least in part on a result of said applying the top drive parameters to the dynamics model. The drilling method also comprises providing, by the controller, the torque commands to a top drive motor coupled to a drillstring by a connector associated with the dynamics model, wherein the torque commands operate to dampen vibrations due to torsional wave propagation along the drillstring.

Each of the embodiments, A and B, may have one or more of the following additional elements in any combination. Element 1: wherein a processing unit uses the dynamics model to determine a disturbance torque at the connector, wherein the disturbance torque accounts for torsional wave propagation along the drillstring. Element 2: wherein the processing unit is part of the controller. Element 3: wherein the processing unit is separate from the controller and provides the determined disturbance torque at the connector to the controller. Element 4: wherein the dynamics model is given as: $T_c = J\dot{V} + \alpha V + \beta - T$, where $T_c$ is the disturbance torque at the connector, J is a rotational inertia, V is a rotational speed of the motor shaft, $\dot{V}$ is the derivative of V with respect to time, α is a friction coefficient, β is a static friction component, and T is a torque applied to the motor.

Element 5: wherein V and T are measured values, and wherein J, α, and β are estimated values. Element 6: wherein J, α, and β are estimated while a drillstring segment is being added to the drillstring. Element 7: wherein the dynamics model involves a state observer applied to the motor, wherein state observer error is interpreted as the disturbance torque at the connector. Element 8: wherein the controller determines the torque commands by combining a speed regulation signal with a vibration dampening signal, wherein the vibration dampening signal is based on the determined disturbance torque at the connector. Element 9: wherein the dynamics model is updated over time based on an error analysis.

Element 10: wherein the result includes an estimate of disturbance torque at the connector, wherein the disturbance torque accounts for torsional wave propagation along the drillstring. Element 11: wherein the processing unit is part of the controller. Element 12: wherein the processing unit is separate from the controller and provides the result to the controller. Element 13: wherein the dynamics model is given as: $T_c = J\dot{V} + \alpha V + \beta - T$, where $T_c$ is the disturbance torque at the connector, J is a rotational inertia, V is a rotational speed of the motor shaft, $\dot{V}$ is the derivative of V with respect to time, α is a friction coefficient, β is a static friction component, and T is a torque applied to the motor. Element 14: wherein estimating the top drive parameters comprises estimating J, α, and β. Element 15: wherein said estimating the top drive parameters is performed while a drillstring segment is being added to the drillstring. Element 16: further comprising obtaining real-time measurements for V and T. Element 17: wherein the dynamics model involves a state observer applied to the top drive motor, wherein state observer error is interpreted as the disturbance torque at the connector. Element 18: wherein generating the torque commands comprises combining a speed regulation signal with a vibration dampening signal, wherein the vibration dampening signal is based on the disturbance torque at the connector.

Numerous other variations and modifications will become apparent to those skilled in the art once the above disclosure is fully appreciated. It is intended that the following claims be interpreted to embrace all such variations and modifications where applicable.

What is claimed is:

1. A downhole drilling system that comprises:
   a top drive, the top drive having a motor with an adjustable torque and a rotating shaft coupled to the motor;
   a drillstring coupled to the rotating shaft via a connector; and
   a controller coupled to the motor, the controller configured to provide torque commands to the motor, wherein the torque commands are based at least in part on a dynamics model and operate to dampen vibrations due to torsional wave propagation along the drillstring.

2. The drilling system of claim 1, wherein a processing unit uses the dynamics model to determine a disturbance torque at the connector, wherein the disturbance torque accounts for torsional wave propagation along the drillstring.

3. The drilling system of claim 2, wherein the processing unit is part of the controller.

4. The drilling system of claim 2, wherein the processing unit is separate from the controller and provides the determined disturbance torque at the connector to the controller.

5. The drilling system of claim 2, wherein the dynamics model is given as: $T_e = J\dot{V} + \alpha V + \beta - T$, where $T_e$ is the disturbance torque at the connector, J is a rotational inertia, V is a rotational speed of the motor shaft, $\dot{V}$ is the derivative of V with respect to time, α is a friction coefficient, β is a static friction component, and T is a torque applied to the motor.

6. The drilling system of claim 5, wherein V and T are measured values, and wherein J, α, and β are estimated values.

7. The drilling system of claim 5, wherein J, α, and β are estimated while a drillstring segment is being added to the drillstring.

8. The drilling system of claim 2, wherein the dynamics model involves a state observer applied to the motor, wherein state observer error is interpreted as the disturbance torque at the connector.

9. The drilling system according to claim 2, wherein the controller determines the torque commands by combining a speed regulation signal with a vibration dampening signal, wherein the vibration dampening signal is based on the determined disturbance torque at the connector.

10. The drilling system according to claim 2, wherein the dynamics model is updated over time based on an error analysis.

11. A downhole drilling method that comprises:
    estimating, by a processing unit, top drive parameters, the top drive having a motor with an adjustable torque and a rotating shaft coupled to the motor;
    applying, by the processing unit, the estimated top drive parameters to a dynamics model;
    generating, by a controller coupled to the motor, torque commands based at least in part on a result of said applying the top drive parameters to the dynamics model; and
    providing, by the controller, the torque commands to the motor having a drillstring coupled to the rotating shaft via a connector, wherein the torque commands operate to dampen vibrations due to torsional wave propagation along the drillstring.

12. The drilling method of claim 11, wherein the result includes an estimate of disturbance torque at the connector, wherein the disturbance torque accounts for torsional wave propagation along the drillstring.

13. The drilling method of claim 11, wherein the processing unit is part of the controller.

14. The drilling method of claim 11, wherein the processing unit is separate from the controller and provides the result to the controller.

15. The drilling method of claim 12, wherein the dynamics model is given as: $T_e = J\dot{V} + \alpha V + \beta - T$, where $T_e$ is the disturbance torque at the connector, J is a rotational inertia, V is a rotational speed of the motor shaft, $\dot{V}$ is the derivative of V with respect to time, α is a friction coefficient, β is a static friction component, and T is a torque applied to the motor.

16. The drilling method of claim 15, wherein estimating the top drive parameters comprises estimating J, α, and β.

17. The drilling method of claim 11, wherein said estimating the top drive parameters is performed while a drillstring segment is being added to the drillstring.

18. The drilling method of claim 15, further comprising obtaining real-time measurements for V and T.

19. The drilling method of claim 12, wherein the dynamics model involves a state observer applied to the top drive motor, wherein state observer error is interpreted as the disturbance torque at the connector.

20. The drilling method according to claim 12, wherein generating the torque commands comprises combining a speed regulation signal with a vibration dampening signal, wherein the vibration dampening signal is based on the disturbance torque at the connector.

\* \* \* \* \*